(12) United States Patent
Nissen

(10) Patent No.: US 7,105,968 B2
(45) Date of Patent: Sep. 12, 2006

(54) MAGNETIC TRANSMISSION

(76) Inventor: Edward William Nissen, 348 Foss Ct., Lake Bluff, IL (US) 60044

( * ) Notice: Subject to any disclaimer, the term of this patent is extended or adjusted under 35 U.S.C. 154(b) by 0 days.

(21) Appl. No.: 11/004,188

(22) Filed: Dec. 3, 2004

(65) Prior Publication Data

US 2006/0119201 A1 Jun. 8, 2006

(51) Int. Cl.
*H02K 49/00* (2006.01)
(52) U.S. Cl. .................... 310/103; 310/80
(58) Field of Classification Search .......... 310/80, 310/75 R, 103, 114–118; 74/DIG. 4
See application file for complete search history.

(56) References Cited

U.S. PATENT DOCUMENTS

| | | | |
|---|---|---|---|
| 4,649,307 A * | 3/1987 | Bech | 310/99 |
| 6,411,001 B1 * | 6/2002 | Henderson et al. | 310/103 |
| 6,731,035 B1 * | 5/2004 | Mu et al. | 310/80 |
| 6,789,442 B1 * | 9/2004 | Forch | 74/409 |

* cited by examiner

*Primary Examiner*—Thanh Lam
(74) *Attorney, Agent, or Firm*—Ziolkowski Patent Solutions Group, SC; Robert J. Brill

(57) ABSTRACT

Embodiments of the present apparatus include a magnetic transmission. The apparatus in this embodiment may have the following components: a plurality of magnetic gears arranged to form at least two gear trains; at least two of the plurality of magnetic gears being non-coaxial; and at least one of the non-coaxial magnetic gears being moveable relative to the other magnetic gears to thereby form the at least two gear trains.

21 Claims, 3 Drawing Sheets

MAGNETIC TRANSMISSION

TECHNICAL FIELD

The present invention relates in general to magnetic gears, and, more particularly, to magnetic transmissions.

BACKGROUND OF THE INVENTION

Gravitational force, electric force and magnetic force are three natural forces that can act at a distance. The use of magnetic forces, such as in magnetic levitation and magnetic bearings, are growing. Many practical applications for the magnetic forces are known, such as magnetically levitated trains, magnetic gears, etc. Conventional mechanical gears that are normally used in machines also have a magnetic counterpart in the magnetic gears.

There are a number of advantages in using magnetic gears over the conventional mechanical gears. For example, mechanical gears can generate much vibration and noise during operation, whereas magnetic gears significantly reduce such vibration and noise. Furthermore, the mechanical gears need lubrication and inspection for wear and tear from time to time. Therefore, if the gears can operate in a non-contact fashion, all those problems caused by friction, wear, vibration and noise disappear. Moreover, such non-contact gears are almost maintenance-free.

Magnetic gears operate through the interaction of magnetic field set up between two magnetic gears, and torque is transmitted by their mutual attraction and repulsion due to a magnetic coupling. Most conventional magnetic gear systems are designed for the coaxial type, because large torque can be transmitted. Because the magnetic coupling is achieved by the action of an electromagnet, problems, such as winding space and control current, must also be considered. Therefore, this type of magnetic gear design becomes rather complicated.

Nevertheless, since the torque transmitted through a coaxial magnetic gear system is provided by mutual interactions involving all the magnets in the two magnetic rings, a large torque can be transmitted by the coaxial magnetic system. However, due to directional restrictions of a coaxial type of magnetic gear transmission system, non-coaxial type of magnetic gear transmission system cannot be completely replaced with the coaxial type. Furthermore, the recent advances in the material research have produced a number of powerful magnets, such as a strong magnetic compound known as neodymium iron boron (NdFeB). Therefore, non-coaxial magnetic gear systems have practical value and there is a need in the art for improved non-coaxial magnetic gear systems.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

In general terms, an embodiment of the present apparatus is a magnetic transmission. The apparatus in this embodiment may have the following components: a plurality of magnetic gears arranged to form at least two gear trains; at least two of the plurality of magnetic gears being non-coaxial; and at least one of the non-coaxial magnetic gears being moveable relative to the other magnetic gears to thereby form the at least two gear trains.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate an embodiment of the present invention and are not intended to limit the scope of the invention.

A magnetic gear system has at least the following advantages over the conventional mechanical gear system. Non-contact operation eliminates problems due to friction and wear, thus resulting in a longer life, easy maintenance, and great reduction of noise and vibration. Operation in special environments needs no lubrication, therefore, being usable in a vacuum, in a dust free chamber or in an environment filled with uncommon gases. There is potential for future development. With advances in electrical and mechanical engineering technologies, the range of applications for magnetic gear systems is unlimitedly increasing.

In general embodiments of the present apparatus the magnetic transmission may have: a plurality of magnetic gears arranged to form at least two gear trains of different gear ratios; at least two of the plurality of magnetic gears being non-coaxial; at least one of the non-coaxial magnetic gears being moveable relative to the other magnetic gears; and a mechanism coupled to the plurality of magnetic gears, the mechanism structured to move the at least one moveable non-coaxial magnetic gear to thereby shift between the gear trains of different gear ratios.

Magnetic gears can be used in place of mechanical gears to reduce undesired vibrations and for applications that require torque coupling between separated members. These devices consist of two separated radially polarized cylindrical magnets constrained to rotate about their respective axes. The magnets are magnetically coupled to one another. When one of the magnets is rotated, it imparts a torque to the second magnet causing it to rotate. The coupling between the magnets is a function of several variables e.g. number of poles, material properties, dimensions and separation. Furthermore, substantial torque can be realized if modern rare-earth magnetic materials are used.

A non-contact magnetic gear does not have any teeth so that the outer contour is a circle. The gear may be made of magnetic material such as ferrite or rare earth magnetic material. The outer surface area is magnetized locally to produce small magnetic poles. Since the interactive magnetic force among the magnetic poles of each gear can work as teeth of regular gear, the torque can be transmitted between gears. It should be noted that there is an airgap between magnetic gears.

In order to obtain smooth rotation, the following requirements should be taken into account: 1) The pitches of two gears should be equal; therefore there is a simple relationship between radius and number of poles of the two gears: (r1:r2=n1:n2). Where r1, r2=radii of the gear, and n1, n2=numbers of poles on the gear. 2) Total number of poles of a magnetic gear should be an even number.

Figure 1:
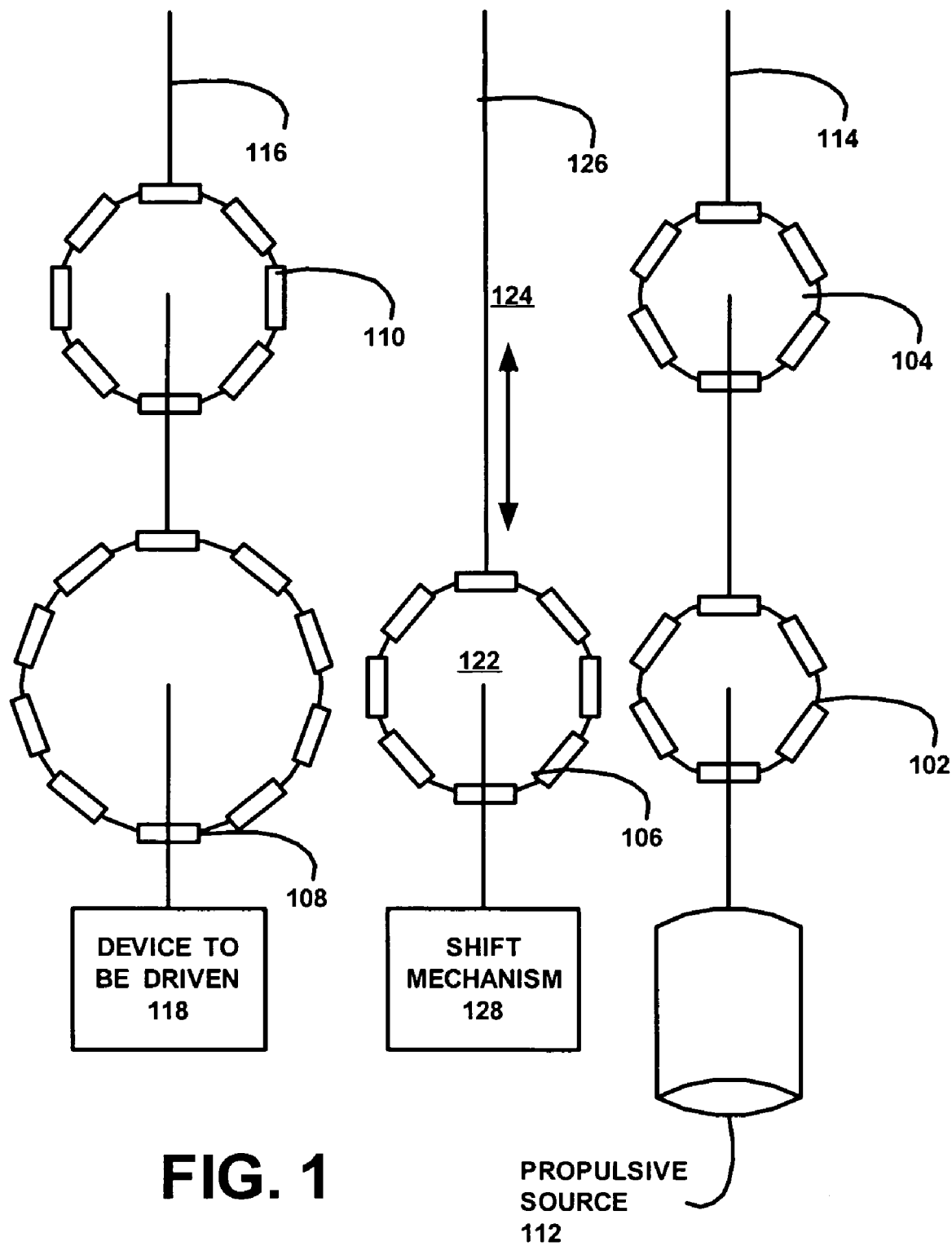
FIG. 1 depicts a block diagram illustrative of a magnetic transmission for use with embodiments of the present apparatus.

FIG. 1 depicts a magnetic transmission having a plurality of magnetic gears 102, 104, 106, 108, 110 arranged to form at least two gear trains of different gear ratios. In this embodiment first and second drive gears 102, 104 may be operatively coupled to a propulsive source 112, such as a motor, steam engine, etc., along a first axle 114.

First and second driven gears 108, 110 may be operative coupled to a second axle 116, which may be operatively coupled to a device to be driven 118, such as a wheel on a vehicle. A moveable gear 106 may be shiftable between a first location 122 where the moveable gear 106 couples the first drive gear 102 to the first driven gear 108 to form a first gear train, and a second location 124 where the moveable gear 106 couples the second drive gear 104 to the second driven gear 110 to form a second gear train.

As depicted in FIG. 1 the first and second gear trains may have different gear ratios. Also, the first and second drive gears 102, 104 may be non-coaxial with the first and second driven gears 108, 110. For shifting between the first and second gear trains, the moveable gear 106 moves linearly along a third axle 126 that is parallel to at least the first axle 114. A mechanism 128 may move the moveable magnetic gear 106 linearly to thereby shift between the gear trains of different gear ratios.

Figure 2:
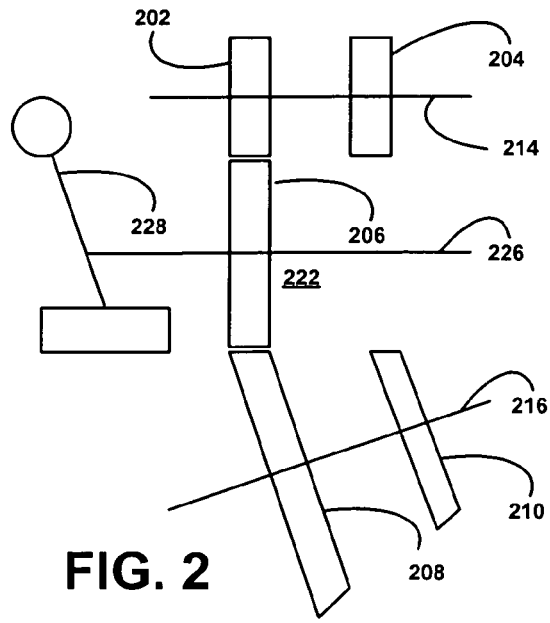
FIGS. 2 and 3 illustrate a further embodiment of a magnetic transmission according to an embodiment of the present apparatus.

FIG. 2 illustrates a more detailed block diagram illustrative of a magnetic transmission having a plurality of magnetic gears 202, 204, 206, 208, 210 arranged to form at least two gear trains of different gear ratios. In this embodiment first and second drive gears 202, 204 may be operatively coupled to a first axle 214.

Figure 3:
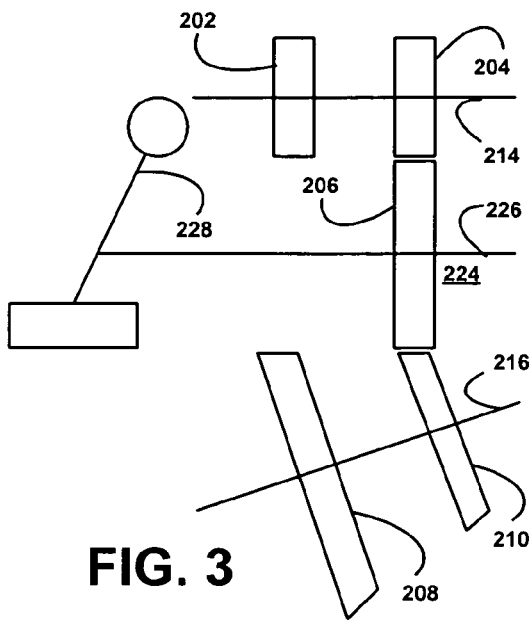

First and second driven gears 208, 210 may be operative coupled to a second axle 216. A moveable gear 220 may be shiftable between a first location 222 where the moveable gear 220 couples the first drive gear 202 to the first driven gear 208 to form a first gear train, and a second location 224 (see FIG. 3) where the moveable gear 220 couples the second drive gear 204 to the second driven gear 210 to form a second gear train.

As depicted in FIG. 1 the first and second gear trains may have different gear ratios. Also, the first and second drive gears 202, 204 may be non-coaxial with the first and second driven gears 208, 210, and the first axle 214 may be at an angle to the second axle 216. For shifting between the first and second gear trains, the moveable gear 206 moves linearly along a third axle 226 that is parallel to at least the first axle 214. A mechanism 228 may move the moveable magnetic gear 206 linearly to thereby shift between the gear trains of different gear ratios.

Figure 4:
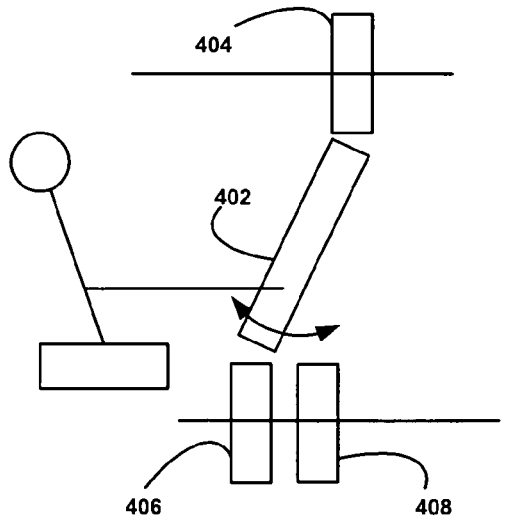
FIGS. 4 and 5 illustrate yet another embodiment of a magnetic transmission according to an embodiment of the present apparatus.
Figure 5:
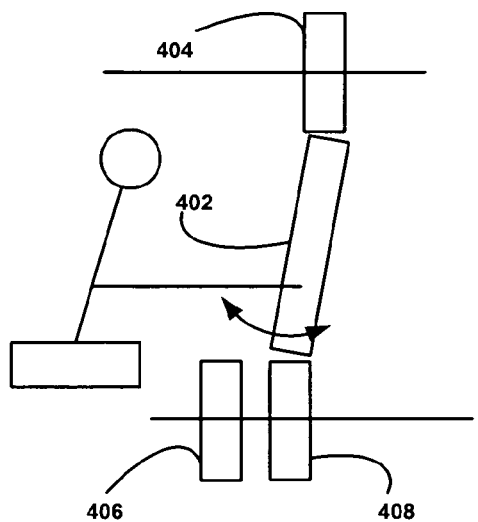

FIG. 4 is a general block diagram depicting an embodiment of the present apparatus in which the moveable gear 402 moves rotationally to couple a drive gear 404 to a driven gear 406 for a first gear train. For a second gear train (see FIG. 5) the moveable gear 402 rotates to operatively couple drive gear 404 to a driven gear 408.

Figure 6:
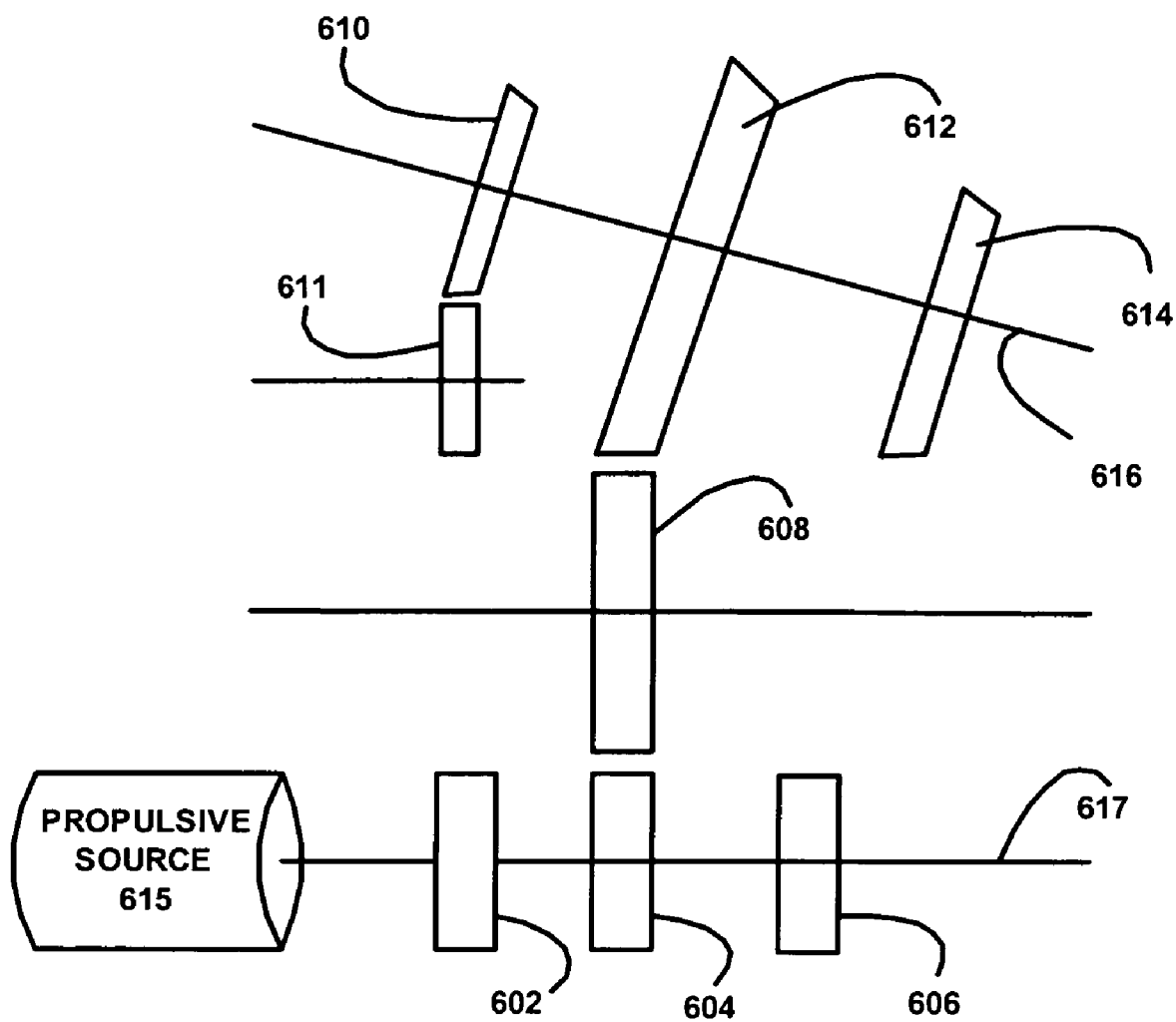
FIG. 6 depicts an embodiment of a magnetic transmission, which has a reverse gear, according to an embodiment of the present apparatus.

FIG. 6 is a block diagram depicting a magnetic transmission having a reverse gear train. The magnetic transmission may have a plurality of magnetic gears 602, 604, 606, 608, 610, 612, 614, 611 arranged to form at least three gear trains of different gear ratios. In this embodiment drive gears 602, 604, 606 may be operatively coupled to a propulsive source 615 along a first axle 617.

Driven gears 610, 612, 614 may be operative coupled to a second axle 616. A moveable gear 608 may couple drive gear 604 to driven gear 612 to form a first gear train, drive gear 606 to driven gear 614 to form a second gear train, and drive gear 602 to driven gear 610 via reverse gear 611.

Therefore, embodiments of the present apparatus provide a magnetic transmission that is an improvement over the prior art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A magnetic transmission, comprising:
   a plurality of magnetic gears arranged to form at least two non-simultaneously coupled gear trains;
   at least two of the plurality of magnetic gears being non-coaxial; and
   at least one of the non-coaxial magnetic gears being moveable relative to the other magnetic gears to thereby motionally change coupling between the at least two non-simultaneously coupled gear trains;
   wherein first and second non-coaxial gears of the at least two of the plurality of magnetic gears are operatively supported on substantially parallel axes, wherein the first non-coaxial gear or the second non-coaxial gear comprises the at least one of the non-coaxial magnetic gears;
   wherein the first non-coaxial gear comprises at least a first permanent magnetic dipole;
   wherein the second non-coaxial gear comprises at least a second permanent magnetic dipole;
   wherein the at least the first permanent magnetic dipole and the at least the second permanent magnetic dipole are arranged so that a polar attraction between the at least the first permanent magnetic dipole and the at least the second permanent magnetic dipole is employable to transmit rotational motion between the first and second non-coaxial gears.

2. The magnetic transmission according to claim 1, wherein each gear of the plurality of magnetic gears has an even number of magnetic dipoles.

3. The magnetic transmission according to claim 1, wherein the at least one of the non-coaxial magnetic gears is linearly moveable relative to the other magnetic gears between:
  a first location that couples a first gear train of the at least two non-simultaneously coupled gear trains; and
  a second location that couples a second gear train of the at least two non-simultaneously coupled gear trains.

4. The magnetic transmission according to claim 1, wherein first and second non-simultaneously coupled gear trains of the at least two non-simultaneously coupled gear trains have different gear ratios.

5. A magnetic transmission, comprising:
  a plurality of magnetic gears arranged to form at least two non-simultaneously coupled gear trains of different gear ratios;
  at least two of the plurality of magnetic gears being non-coaxial;
  at least one of the non-coaxial magnetic gears being moveable relative to the other magnetic gears; and
  a mechanism coupled to the plurality of magnetic gears, the mechanism structured to move the at least one moveable non-coaxial magnetic gear to thereby motionally change coupling between the at least two non-simultaneously coupled gear trains of different gear ratios;
  wherein first and second non-coaxial gears of the at least two of the plurality of magnetic gears are operatively supported on substantially parallel axes, wherein the first non-coaxial gear or the second non-coaxial gear comprises the at least one moveable non-coaxial magnetic gear;
  wherein the first non-coaxial gear comprises at least a first permanent magnetic dipole;
  wherein the second non-coaxial gear comprises at least a second permanent magnetic dipole;
  wherein the at least the first permanent magnetic dipole and the at least the second permanent magnetic dipole are arranged so that a polar attraction between the at least the first permanent magnetic dipole and the at least the second permanent magnetic dipole is employable to transmit rotational motion between the first and second non-coaxial gears.

6. The magnetic transmission according to claim 5, wherein each gear of the plurality of magnetic gears has an even number of magnetic dipoles.

7. The magnetic transmission according to claim 5, wherein the at least one moveable non-coaxial magnetic gear is linearly moveable relative to the other magnetic gears.

8. The magnetic transmission according to claim 5, wherein first and second non-simultaneously coupled gear trains of the at least two non-simultaneously coupled gear trains have different gear ratios, wherein the first gear train comprises a first gear ratio, wherein the second gear train comprises a second gear ratio, wherein the mechanism is structured to move the at least one moveable non-coaxial magnetic gear linearly relative to the other magnetic gears between;
  a first location that couples the first gear train of the first gear ratio; and
  a second location that couples the second gear train of the second gear ratio.

9. A magnetic transmission, comprising:
  a plurality of magnetic gears;
  at least first and second drive gears operatively coupled to a propulsive source along a first axle;
  at least first and second driven gears operatively coupled to a second axle; and
  at least one moveable gear that motionally changes between a first location where the moveable gear couples the first drive gear to the first driven gear to form a first gear train, and a second location where the at least one moveable gear couples the second drive gear to the second driven gear to form a second gear train, wherein at the second location the at least one moveable gear is decoupled from the first drive gear and the first driven gear;
  wherein the first and second axles are substantially parallel, wherein the first axle operatively supports the at least first and second drive gears, wherein the second axle operatively supports the at least first and second driven gears;
  wherein the first drive gear comprises at least a permanent magnetic dipole;
  wherein the at least one moveable gear comprises at least a second permanent magnetic dipole;
  wherein the at least the first permanent magnetic dipole and the at least the second permanent magnetic dipole are arranged so that a polar attraction between the at least the first permanent magnetic dipole and the at least the second permanent magnetic dipole is employable to transmit rotational motion between the first drive gear and the at least one moveable gear.

10. The magnetic transmission according to claim 9, wherein each gear of the plurality of magnetic gears has an even number of magnetic dipoles.

11. The magnetic transmission according to claim 9, wherein the first and second gear trains have different gear ratios, wherein the first and second gear trains comprise non-simultaneously coupled gear trains.

12. The magnetic transmission according to claim 9, wherein the first and second drive gears are non-coaxial with the first and second driven gears.

13. The magnetic transmission according to claim 9, wherein the at least one moveable gear moves;
  linearly along a third axle that is parallel to the first axle; and
    between the first and second locations for the first and second gear trains, respectively.

14. The magnetic transmission according to claim 1, wherein at least one gear train of the at least two non-simultaneously coupled gear trains comprises a direct magnetic transmission relationship in a direction of an applied field.

15. The magnetic transmission according to claim 14, wherein in the direct magnetic transmission relationship of the at least one gear train of the at least two non-simultaneously coupled gear trains, the at least one gear train of the at least two non-simultaneously coupled gear trains comprises substantially parallel magnetic fields.

16. The magnetic transmission according to claim 1, wherein at least one gear in the at least one gear train of the at least two non-simultaneously coupled gear trains comprises a plurality of magnetic dipoles that tend to align with a magnetic field of another gear in the at least one gear train of the at least two non-simultaneously coupled gear trains.

17. The magnetic transmission according to claim 5, wherein at least one gear train of the at least two non-simultaneously coupled gear trains comprises a direct magnetic transmission relationship in a direction of an applied field.

18. The magnetic transmission according to claim 17, wherein in the direct magnetic transmission relationship of the at least one gear train of the at least two non-simultaneously coupled gear trains of different gear ratios, the at least one gear train of the at least two non-simultaneously coupled gear trains comprises substantially parallel magnetic fields.

19. The magnetic transmission according to claim 9, wherein at least one gear train of the first and second gear trains comprises a direct magnetic transmission relationship in a direction of an applied field.

20. The magnetic transmission according to claim 19, wherein in the direct magnetic transmission relationship of the at least one gear train of the first and second gear trains, the at least one gear train of the first and second gear trains comprises substantially parallel magnetic fields.

21. The magnetic transmission according to claim 9, wherein at least one gear in the at least one gear train of the first and second gear trains comprises a plurality of magnetic dipoles that tend to align with a magnetic field of another gear in the at least one gear train of the first and second gear trains.

* * * * *

UNITED STATES PATENT AND TRADEMARK OFFICE
CERTIFICATE OF CORRECTION

| | |
|---|---|
| PATENT NO. | : 7,105,968 B2 |
| APPLICATION NO. | : 11/004188 |
| DATED | : September 12, 2006 |
| INVENTOR(S) | : Edward W. Nissen |

It is certified that error appears in the above-identified patent and that said Letters Patent is hereby corrected as shown below:

Col. 6, line 17 (claim 9), insert "first" after "a".

Signed and Sealed this

Fifth Day of December, 2006

JON W. DUDAS
*Director of the United States Patent and Trademark Office*